United States Patent [19]

Drescher et al.

[11] 4,330,010
[45] May 18, 1982

[54] APPARATUS FOR THE LEAKAGE-FREE CONNECTION OF CAVITIES IN TUBES AND VESSELS

[75] Inventors: Wolfgang Drescher; Eilt-Heyo Rittberg, both of Wilhelmshaven, Fed. Rep. of Germany

[73] Assignee: Olympia Werke AG, Wilhelmshaven, Fed. Rep. of Germany

[21] Appl. No.: 123,973

[22] Filed: Feb. 25, 1980

[30] Foreign Application Priority Data

Feb. 26, 1979 [DE] Fed. Rep. of Germany ....... 2907457

[51] Int. Cl.³ .................... F16L 37/28; F16L 55/14
[52] U.S. Cl. .................... 137/614.06; 251/4
[58] Field of Search ............. 137/614, 614.06; 251/149.9, 149.6, 149, 149.5, 4, 6

[56] References Cited

U.S. PATENT DOCUMENTS

| 1,810,366 | 6/1931 | Martin | 251/149.5 |
| 3,329,390 | 7/1967 | Hulsey | 251/4 |
| 3,685,786 | 8/1972 | Woodson | 251/4 |
| 3,965,925 | 6/1976 | Gooch | 251/4 X |
| 4,111,342 | 9/1978 | Kirby | 251/149.5 X |

FOREIGN PATENT DOCUMENTS 936438 11/1973 Canada ..................... 251/4

1548745 12/1972 Fed. Rep. of Germany .
2416836 4/1976 Fed. Rep. of Germany .

Primary Examiner—A. Michael Chambers
Attorney, Agent, or Firm—Spencer & Kaye

[57] ABSTRACT

In a coupling device for establishing a leakage-free connection between the interiors of two enclosures to permit the passage of fluid therebetween, which device includes two coupling tubes each arranged to be in communication with the interior of a respective enclosure and each being provided with a controllable closing member formed to define a closeable flow passage in its respective tube, the tubes being arrestable against one another in a position to establish a leakage-free connection between their flow passages, and two operating members each operatively associated with a respective closing member and movable relative to its associated closing member between a position in which the associated flow passage is closed and a position in which the associated flow passage is open, one of the operating members is provided with a coupling projection and the other of the operating members is provided with a recess formed to mate with the projection for causing the operating members to move in unison between the positions when the tubes are in the position to establish a leakage-free connection between their flow passages.

4 Claims, 11 Drawing Figures

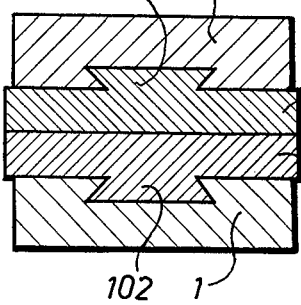
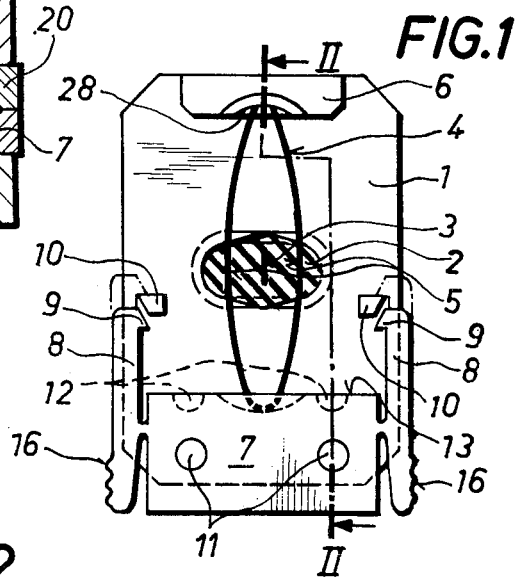
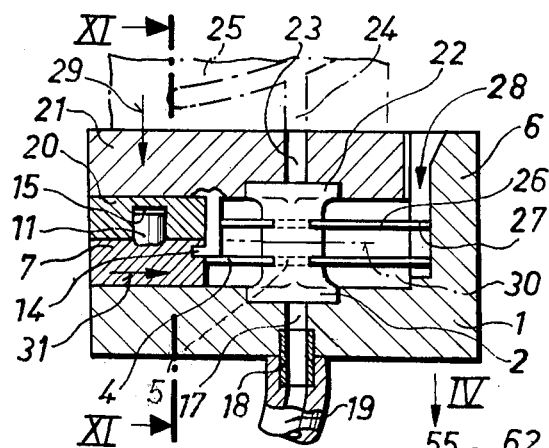
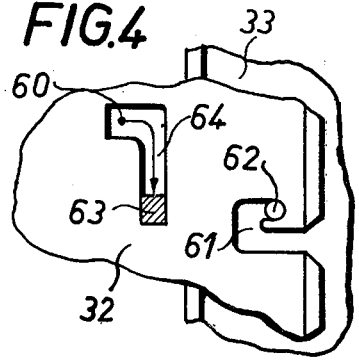
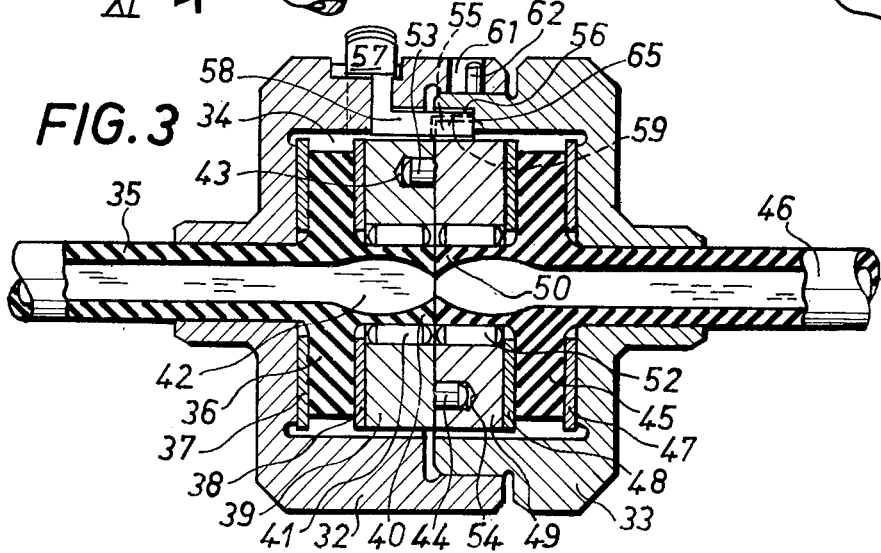

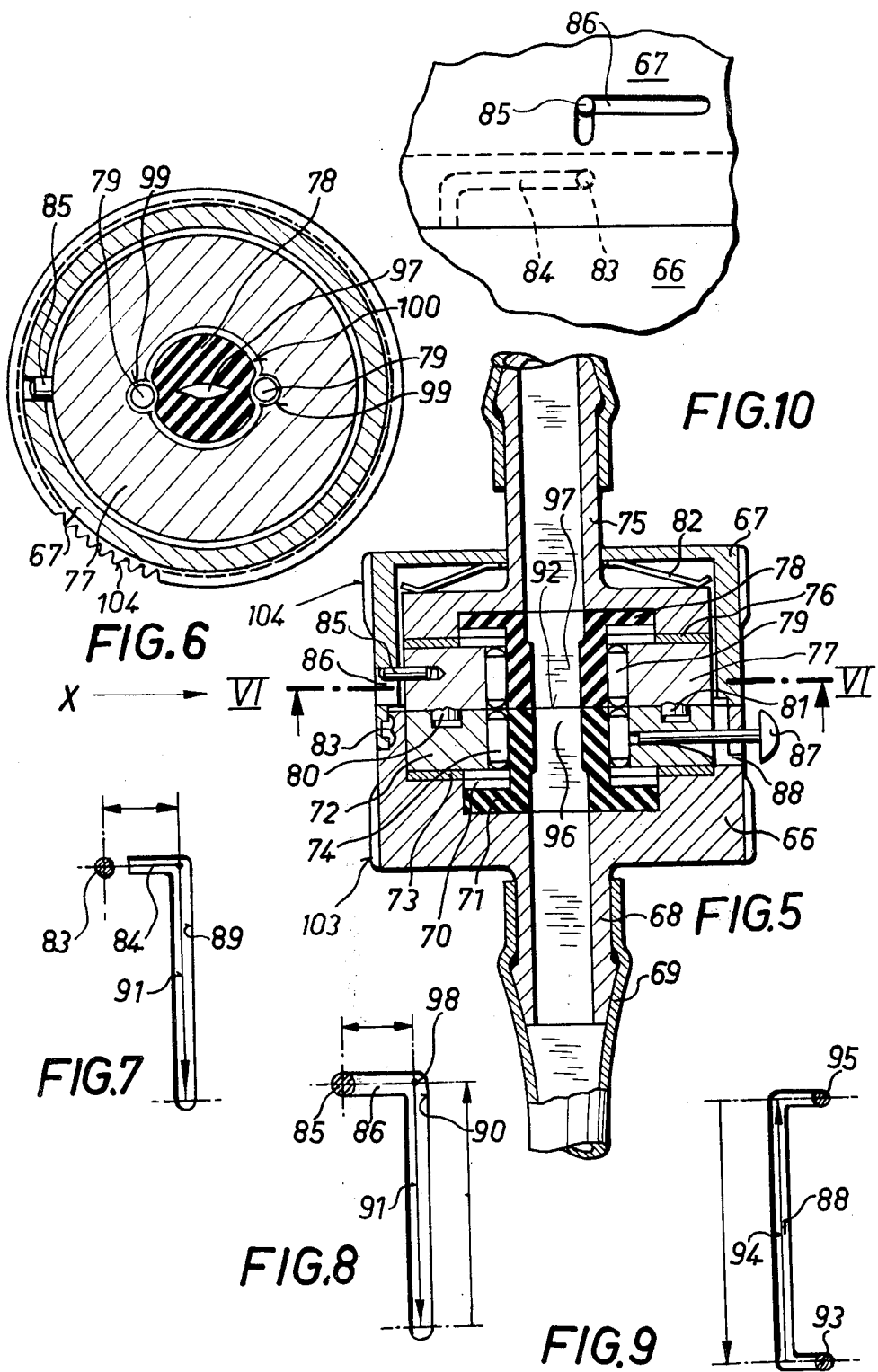

4,330,010

APPARATUS FOR THE LEAKAGE-FREE CONNECTION OF CAVITIES IN TUBES AND VESSELS

BACKGROUND OF THE INVENTION

The present application relates to a device for establishing leakage free connection of the interiors of tubes and vessels, which device is of the type that includes two coupling tubes each arranged to be in communication with the interior of a respective tube or vessel and to bear against one another and each provided with a closing member defining a closeable flow passage in its respective tube and two operating members each operatively associated with, and movable relative to a respective closing member to open and close the associated flow passage.

Such devices are used to establish a flow connection between two tubes, vessels or the like which are filled, for example, with ink. The means to be connected together, such as hose ends and the like, must be coupled together reliably. The manipulations involved in the coupling process must be performable by relatively unskilled personnel and the fluid medium must not be permitted to escape nor must air from the atmosphere enter into the connection point or into the interiors of the tubes or vessels. In addition, it is desirable that such device be usable for hydraulic as well as pneumatic systems.

German Pat. No. 2,416,836 discloses such a device which includes connecting tubes for coupling and securing. Each connecting tube is kept closed by a deformable closing, or blocking, member. When the connecting tubes are brought together, the closing member of each tube is displaced by rigid abutments disposed at the other tube. This produces a flow passage in each connecting tube through which the fluid can flow. This flow passage is produced already during the connection together of the connecting tubes and this apparatus provides no opportunity to close the flow passage while the connecting tubes are coupled together.

SUMMARY OF THE INVENTION

It is an object of the present invention to improve such leakage free connections, particularly so that the opening movement of the connection is initiated only after the flow passages have been closed completely, and the closing movement is terminated before the flow passages are opened.

These and other objects are achieved, according to the present invention, in a coupling device for establishing a leakage-free connection between the interiors of two enclosures to permit the passage of fluid therebetween, which device includes two coupling tubes each arranged to be in communication with the interior of a respective enclosure and each being provided with a controllable closing member formed to define a closeable flow passage in its respective tube, the tube being arrestable against one another in a position to establish a leakage-free connection between their flow passages, and two operating members each operatively associated with a respective closing member and movable relative to its associated closing member between a position in which the associated flow passage is closed and a position in which the associated flow passage is open, by providing one of the operating members with a coupling projection and the other of the operating members with a recess formed to mate with the projection for causing the operating members to move in unison between the positions when the tubes are in the position to establish a leakage-free connection between their flow passages.

One feature of devices according to the invention is that they convey a sure tactile sensation of closing and opening to the person handling them. The connecting tubes or the connections made therewith, respectively, can also be used in many ways in ink jet printers.

Although German Auslegeschrift [Published Patent Application] No. 1,548,745 discloses a dye container for making devices in measuring instruments, the vessel which is closed on all sides is kept closed in one area by an elastic nipple which is tapered toward the container and which is provided with essentially axial slits in its closing region. The closing member is self-closing and must be opened by a marker that is introduced, the marker itself not being closable.

BRIEF DESCRIPTION OF THE DRAWING

FIG. 1 is an elevational view of a connecting tube in the form of a socket member constituting one part of a coupling according to the invention.

FIG. 2 is a cross-sectional view of a preferred embodiment of a coupling according to the invention which includes the structure of FIG. 1, and which is taken along the section line II—II of FIG. 1.

FIG. 3 is a cross-sectional view similar to that of FIG. 2 of an embodiment of a coupling according to the invention composed of sleeve-shaped housing members.

FIG. 4 is a top plan detail view taken in the direction of the arrow IV in FIG. 3 and showing the structure for connecting the housing members together.

FIG. 5 is a cross-sectional view similar to that of FIG. 2 of a further embodiment of a coupling according to the invention.

FIG. 6 is a cross-sectional view taken along the section of line VI—VI of FIG. 5.

FIGS. 7 through 9 are detail views illustrating positioning and connecting structures for the closing and opening of the coupling of FIG. 5.

FIG. 10 is a detail view taken in the direction of the arrow X associated with FIG. 5.

FIG. 11 is a cross-sectional view taken along the section line XI—XI of FIG. 2.

DESCRIPTION OF THE PREFERRED EMBODIMENTS

FIG. 1 shows a socket member 1 which may constitute a carriage or part of a carriage which is mounted to be movable in the direction of a printed line in an ink jet printer and which is provided with an ink printing head, shown in FIG. 2, from which ink is ejected onto the surface of a record carrier. In correspondence with the further embodiments to be described, the present invention is not bound to such an embodiment.

The socket member 1 is provided with a closing member 2 in a passage leading toward the bottom. The closing member 2 is fastened in the socket member 1, for example by vulcanization and is provided with a slit-like passage 3 which is normally tightly closed and which, under the appropriate stress, is open to permit flow of fluid therethrough. The closed state of passage establishes itself automatically or is created by means of the spring 4 shown in the drawing figure.

This spring, which also serves to open the slit-like passage, has a generally oval shape and is vulcanized at 5, located essentially in its center portion, into the closing member 2. One end of the spring is located, on the one hand, in an abutment 6 forming part of the socket member 1 and the other end of the spring engages in an operating member 7 displaceably arranged on the socket member so that when the distance between the operating member 7 and the abutment 6 is reduced, the spring is spread apart in the direction of its minor axis. This spreading movement simultaneously opens the passage 3 in closing member 2.

The operating member 7 is provided with one or, as shown in the drawing, two arresting members 8 which may be integral with the adjustment unit if the latter is made of an appropriate material, for example plastic. The arresting members 8 are each provided with a detent tongue 9 which can be engaged behind a detent pin 10 fastened in the socket member 1, thus assuring that the closing member 2 remains in the open position during the period of engagement.

As shown in FIG. 2, the operating unit 7 is provided with two fingers, or pins, 11, each of which is arranged to enter into a respective recess 15 provided in a counterpiece constituted by a second operating member 20. Moreover, one or two recesses 12 are provided in a longitudinal side 13 of the operating member 7 for accommodating detent hooks 14 secured to, e.g. integral with, a socket member 21 which will be described below. Unlocking of operating member 7 is effected by manual pressure against actuating parts 16 in the extension of the arresting members 8. Each member 8 has the form of a lever with tongue 9 and part 16 located to respectively opposite sides of the pivot connection of member 8 to member 7.

FIG. 2 shows two socket members, each having the form shown in FIG. 1, which have been coupled together. The closing member 2 is secured to the socket member 1. A through bore 17 is provided in socket member 1 and a tube 19 is connected thereto via a sleeve 18. Operating members 7 and 20 are brought together in such a manner that pins 11 enter recesses 15. The two operating members 7 and 20 are shown in a position in which the flow passage 3, shown in FIG. 1, is open and the detent tongues 9 have become hooked behind the detent pins 10.

The second socket member 21 is equipped with a closing member 22, an oval spring 26 and a through bore 23, identical to components 2, 4 and 17, respectively, of socket member 1 and has been placed onto the socket member 1 by movement in the direction of arrow 29, the second socket member being oriented relative to member 1 by means of a suitable guide (not shown) cooperating with abutment 6 of socket member 1. The operating member 20 is movably mounted on the socket member 21 in the same manner as the adjusting means 7 is mounted on socket member 1 in FIG. 1. This means 7 and 20 are connected to its associated support plate 1 or 21 as specially shown in FIG. 11. For instance, the members 7 and 20 are sliding in the support plates 1 and 21 by bearing fits 101 and 102 in the direction of arrow 31 (FIG. 2).

The socket member 21 carries the detent hook or hooks 14 and it is thus assured that the socket member 21 cannot be separated from socket member 1 when the operating members are in the passage opening position shown in FIG. 2. The closing member 22 of socket member 21 is provided with a flow passage corresponding to the passage 3 of closing member 2 in FIG. 1 and the bore 23 in socket member 21 leads to corresponding channels 24 in an ink printing head 25 mounted on socket member 21.

When the socket member 21 is placed onto the socket member 1, one end 27 of spring 26 is lowered into a groove 28 in abutment 6, a corresponding end of spring 4 also being disposed in groove 28.

The opening and closing operations take place as follows:

Before the socket members 1 and 21 are brought together, the operating members 7 and 20 are both in the position shown in FIG. 1 for member 7. When the member 21 is placed on, it is engaged by the abutment 6 while at the same time the free end 27 of spring 26 is lowered into groove 28 and the fingers 11 of adjusting means 7 engage in the bores 15 of operating member 20. The lowering movement, in the direction of arrow 29, is completed when the closing members 2 and 22 come to rest flush against one another via their planar frontal faces along the dividing plane 30.

If now the operating members 7 and 20 are moved in the direction of the arrow 31, they act on springs 4 and 26 to produce an opening movement for the slits in the closing members, and the detent tongue or tongues 14 engage in the recess or recesses 12 of the operating member 7 so that it is no longer possible to separate the socket members 1 and 21. The insertion depth of the detent tongue 14 into the operating member 7 is such as to permit opening of this connection only after the operating members have been retracted enough to enable springs 4 and 26 to close the slits in the closing members 2 and 22.

FIG. 3 shows an embodiment of the invention for connecting together hose lines having a sleeve or cylinder shape and each composed of a housing member 32 or 33. The housing members 32 and 33 are connected together by a bayonet closure, shown in FIG. 4, and by being telescoped together, via mating cup-like portions.

The housing member 32 shown on the left presents a cavity 34 into which a tubular line, for example a hose 35 of an elastic material, has been inserted. The tubular line 35 is provided with a ring-like lateral extension 36 via which the hose or tubular line 35 can be secured in the housing 32. Between end wall of housing member 32 and this ring-like extension 36 there is disposed a disc 37 and the oppositely disposed frontal face of the ring-like extension 36 is also covered by a disc 38.

An operating member 39 is placed against disc 38. This operating member likewise has an annular shape and is held in the housing to be rotatably movable relative thereto. Operating member 39 encloses a recess, or cavity, which accommodates an end piece 40 of the tubular line 35 and two roller members 41 the structure of which is shown in detail in FIG. 6 and will be described in detail below. The end piece 40 is designed like the closing members 3 and 22 shown in FIGS. 1 and 2 and is provided with a throughgoing longitudinal slit 42 which is here shown in the open position. Furthermore, the operating member 39 is provided with a bore 43 and a pin 44.

The other housing member 33 likewise serves to accommodate a ring-like lateral extension 45 of a tubular line 46, two discs 47 and 48 in front of and behind, respectively, this ring-like extension and an annular operating member 49 into whose cavity have been inserted an end piece 50 of the tubular line 46 and corresponding roller bodies 52. The operating member 49 is provided with a pin 53 which engages into the bore 43 of the operating member 39, and with a bore 54 of the operating member 39, and with a bore 54 to accommodate the pin 44 of operating member 39.

The operating member 49 is further provided with a lateral extension 55 which, when the operating members 39 and 49 are being rotated together, is able to slide in an annular recess 56 in housing member 33. The housing member 32 is provided with a handle 57 having an extension 58 which extends into recess 56. Extension 58 is provided at its free end with a recess 59 in which extension 55 engages to rotationally couple handle 57 and operating member 49 together.

The handle 57 is mounted to be movable in a manner shown in FIG. 4. When the housing members 32 and 33 are brought together, the handle 57 is in a position corresponding to that represented by point 60 in FIG. 4. Faces at the operating members 39 and 49 together with the associated closing members 40 and 50 form essentially a plane which corresponds to the separating plane 30 shown in FIG. 2. The connection of the housing members and their arresting is effected by means of a bayonet closure formed of a slot 61 in the housing member 32 and a pin 62 in the housing member 33. The housing members are brought together against a spring action which is provided here, for example, by the ring-like extensions 36 and 45. This bayonet closure is secured by movement of the handle 57 from the position 60 into the position 63. The operating members 39 and 49 are thus rotated by the movement induced in extension 55 about an angle which brings their associated closing members into the open position. The angular movement required to open the passages approximately corresponds to the length of the slot 64 shown in FIG. 4. In the area of the extension 55, the extension 58 rests via a contact face 65 thereof against a surface of housing member 33 defining an inner face of the annular recess 56, while the opposite end of extension 58 bears against the side of slot 64, creating a clamping action so that the pin 62 of the bayonet closure cannot be displaced in slot 61 in the axial direction of the connection.

In the embodiment shown in FIG. 5, the coupling is formed of two connecting tubes each including a respective housing 66 or 67. Housing 66 is provided with a nipple 68 for connecting a tubular line 69, and with a cavity 70 housing a closing member 71 identical to member 40 or 50. Closing member 71 is acted on by an operating member 72 located within housing 66 and supported at an inner wall of the housing 66 via a slide disc 73. In the recess enclosed by member 72 there are mounted rollers 74 which are placed against the closing member 71 and whose operation is shown in FIG. 6 and will be described in connection therewith.

The housing 67 serves to accommodate a connecting piece 75, a slide disc 76, an operating member 77 and a closing member 78 which is fastened to the connecting piece 75. Members 77 and 78 are essentially identical to members 72 and 71. As in the manner described above, roller bodies 79 are housed in operating member 77.

Operating members 72 and 77 are coupled together, in the assembled state, via fingers 80 and 81 carried by member 77 and engaging in recesses in member 72. A spring 82 is inserted between housing 67 and connecting piece 75 to oppose displacement of piece 75 relative to housing 67 when the connecting tubes are put together. The operating members 72 and 77 as well as the closing members 71 and 78 contact one another along a plane in the manner shown along plane 30 in FIG. 2.

The housings are connectable together by means of a bayonet closure composed essentially of a pin 83 in the housing 66 and a slot 84 in housing 67. FIG. 7 shows the movement of the pin 83 in slot 84 when the connecting tubes are put together. The operating member 77 is provided with a pin 85 which engages in a corresponding slot 86 in housing 67. The guiding of pin 85 in slot 86 is shown in detail in FIG. 8. The operating member 72 is provided with a handle 87 which can be gripped from outside the housing 66 and which cooperates with a slot 88 in housing 66. The relative movement of the handle 87 in slot 88 is shown in FIG. 9. Handle 87 includes a shaft seated in an opening in operating member 72. The shaft is made to have a certain degree of flexibility and the opening is appropriately flared to enable the shaft to be positively held at positions 93 and 95 and to be elastically deflected while traveling between those positions.

When the coupling composed of these parts is put together, the pin 83 engages in slot 84, which is open at the free end of its short side and travels therealong until abutting at slot edge 89. At the same time, pin 85 travels along slot 86 until it abuts at the edge 90 shown in FIG. 8. In this connection it must be noted that the pin 85 is permanently disposed in slot 86 and need not be brought into this slot.

If now housing 66 and 67 are rotated relative to one another in the sense of the rotary movement shown by arrows 91 in FIGS. 7 and 8, the pins 83 and 85 reach the ends of the associated slots 84 and 86. The connection can then still be released at any time. The frontal faces of the closing pieces 71 and 78 are pressed against one another in the separating plane 92. The closing pieces themselves are still closed.

Handle 87 is initially in the engaged position 93 shown in FIG. 9, and when it is moved through the path shown by arrow 94, which path equals path 91, into the second possible detent position 95, the operating members 72 and 77 are both rotated and simultaneously open the closing members 71 and 78 thus opening the flow passages 96 and 97 provided therein. During this rotary movement, the pin 85 moves in slot 86 back to the location 98 in FIG. 8 so that the connection between the connecting tubes is locked and can be unlocked only be returning the handle 87 back to position 93.

The opening and closing process and the opening and closing of the flow passages 96 and 97 will now be explained with reference to FIG. 6. Housing 67 is shown along the section line VI—VI of FIG. 5, which corresponds to a cross section plane extending in the same manner through the connection of FIG. 3 but not there identified, with the operating member 77 rotatably movably inserted in housing 67. The closing member 78 is disposed in the cavity of the operating member 77 and member 77 is provided with roller bodies 79 which have been inserted into openings 99 and press against the closing member 78 in such a manner that, in this position, the flow passage 97 is opened by widening of the slit in member 78.

Upon a rotary movement of the operating member 77 relative to housing 67 closing member 78 remains fixed to housing 67 and the roller bodies move around the circumference 100 of closing member 78 while simultaneously slightly pressing against it so that, depending on the position of the roller bodies, the open or closed position of member 78 can be reached. Movement of the operating member is controlled by handle 57 or 87 as shown in FIGS. 3 and 5.

FIG. 10 illustrates the manner in which grooves 84 and 86 can be positioned relative to one another in housing 67. Groove 84 and pin 83, being hidden in that view, are shown in broken lines. The axially extending portion of groove 84 is open at the end of housing 67 to permit insertion of pin 83 therein.

The knurling 103 (FIG. 5) in the lower part and around the periphery of housing 66 and the knurling 104 (in FIGS. 5 and 6) in the upper part and around the periphery of housing 67 is to manipulate the device during the opening and closing movements.

It will be understood that the above description of the present invention is susceptible to various modifications, changes and adaptations, and the same are intended to be comprehended within the meaning and range of equivalents of the appended claims.

What is claimed is:

1. In a coupling device for establishing a leakage-free connection between the interiors of two enclosures to permit the passage of fluid therebetween, which device includes two coupling tubes each arranged to be in communication with the interior of a respective enclosure and each defining a controllable closing member formed to present a closeable flow passage in its respective tube, the tubes being engageable against one another in a position to establish a leakage-free connection between their flow passages, and two operating members each operatively associated with a respective closing member and movable relative to its associated closing member between a position in which the associated flow passage is closed and a position in which the associated flow passage is open, the improvement wherein one of said operating members is provided with a coupling projection and the other of said operating members is provided with a recess formed to mate with said projection for causing said operating members to move in unison between said positions when said tubes are in the position to establish a leakage-free connection between their flow passages, and said device further comprises: two cylindrical housings; means supporting a respective coupling tube and operating member in each said housing, each said operating member being disposed concentrically about its associated closing member and being constructed to undergo rotational movement between its positions; bayonet closure means for connecting said housings together and composed of a groove and a pin each provided on a respective one of said housings in such a manner that engagement of said pin in said groove places said coupling tubes in engagement against one another; a manual actuating member engageable with one of said operating members when said housings are connected together by said closure means for moving said operating members between their said positions; and wherein one of said housings is provided with a groove through which said actuating member extends to a location outside of said housings and the other of said housings presents an abutment surface arranged such that when said housings are connected together and said operating members are in said position for opening said flow passages, engagement between said actuating member and said abutment prevents disconnection of said housings.

2. An arrangement as defined in claim 1 wherein said means supporting a respective coupling tube and operating member in each said housing comprise a spring component urging said coupling tube longitudinally of said housing to promote engagement of said coupling against one another when said housings are connected together.

3. An arrangement as defined in claim 2 wherein each said spring component is constituted by a body of rubber.

4. In a coupling device for establishing a leakage-free connection between the interiors of two enclosures to permit the passage of fluid therebetween, which device includes two coupling tubes each arranged to be in communication with the interior of a respective enclosure and each defining a controllable closing member formed to present a closeable flow passage in its respective tube, the tubes being engageable against one another in a position to establish a leakage-free connection between their flow passages, and two operating members each operatively associated with a respective closing member and movable relative to its associated closing member between a position in which the associated flow passage is closed and a position in which the associated flow passage is open, the improvement wherein one of said operating members is provided with a coupling projection and the other of said operating members is provided with a recess formed to mate with said projection for causing said operating members to move in unison between said positions when said tubes are in the position to establish a leakage-free connection between their flow passages, and said device further comprises: first and second cylindrical housings in each of which a respective coupling tube and operating member are disposed, each said operating member being disposed around its associated closing member and concentrically to the axis of its associated housing and being constructed to undergo rotational movement between its positions and about the axis of its associated housing; bayonet closure means for connecting said housings together with their longitudinal axis coaxially disposed, said closure means being composed of a groove and a pin each provided on a respective one of said housings in such a manner that engagement of said pin in said groove urges said coupling tubes into engagement against one another; supporting means supporting one of said coupling tubes in its associated housing for movement relative to its associated housing along the axis thereof, said supporting means acting to urge said coupling tube which it supports toward the other said coupling tube when said housings are connected together; and connecting members associated with each said coupling tube for connecting it to a conduit communicating with the interior of a respective enclosure, wherein: each said closing member is constituted by a body of elastic material; said operating members are provided with respective planar faces which bear against one another when said coupling tubes engage against one another; and said closure means is disposed for causing said housing which is associated with said supporting means to be displaced toward the other said housing against the action of said supporting means in response to engagement of said pin in said groove.

* * * * *